US005146066A

United States Patent [19]

Brun et al.

[11] Patent Number: 5,146,066

[45] Date of Patent: Sep. 8, 1992

[54] BILL PUBLISHING APPARATUS

[75] Inventors: Jean-Paul Brun; Jean-Louis Sarradin, both of Argenteuil; Christian Dol, Gyf s/Yvette, all of France

[73] Assignee: Societe d'Applications Generales d'Eleciricite et de Mecanique Sagem, Paris, France

[21] Appl. No.: 634,996

[22] Filed: Dec. 27, 1990

[30] Foreign Application Priority Data

Dec. 27, 1989 [FR] France ............................... 89 17248

[51] Int. Cl.$^5$ ........................... G06K 5/00; B41F 3/04

[52] U.S. Cl. .................................... 235/380; 235/379; 235/432; 235/441; 101/269

[58] Field of Search ............... 235/380, 432, 449, 379, 235/441; 902/22, 24; 101/269

[56] References Cited

U.S. PATENT DOCUMENTS

| | | | |
|---|---|---|---|
| 3,610,889 | 10/1971 | Goldman . | |
| 3,693,156 | 9/1972 | DiLello | 340/149 R |
| 4,202,549 | 5/1980 | Takeuchi | 369/33 |
| 4,260,162 | 4/1981 | Morii et al. | 369/215 |
| 4,628,896 | 7/1982 | Carlson et al. | 235/380 |
| 4,659,914 | 4/1987 | Kondo et al. | 235/380 |
| 4,775,784 | 10/1988 | Stark | 235/380 |
| 4,782,217 | 11/1988 | Soza et al. | 235/380 |
| 4,827,113 | 5/1989 | Rikuna | 235/380 |
| 4,843,220 | 6/1989 | Haun | 235/380 |

FOREIGN PATENT DOCUMENTS

| | | |
|---|---|---|
| 0149084 | 7/1985 | European Pat. Off. . |
| 1574153 | 1/1972 | Fed. Rep. of Germany . |
| A0148084 | 10/1985 | France . |
| 2565005 | 11/1985 | France . |
| 88/05575 | 1/1988 | PCT Int'l Appl. . |

*Primary Examiner*—Stuart S. Levy
*Assistant Examiner*—Tan Nguyen
*Attorney, Agent, or Firm*—Lowe, Price, LeBlanc & Becker

[57] ABSTRACT

A bill publishing apparatus is disclosed, for payment by use of a bank card, including an element for receiving a bank card, an element for receiving a bill, a printing drum with rotary wheels each carrying a series of characters and a mobile carriage carrying a printing roller. Each drum wheel is fast for rotation with a coding disk carrying a series of codes associated respectively with the characters of the wheel. An element for reading the codes and an element controlled by the reading element are provided for recording an angular positions of the wheels and so values of the characters.

8 Claims, 2 Drawing Sheets

BILL PUBLISHING APPARATUS

FIELD OF THE INVENTION

The present invention relates to an apparatus for publishing payment slips at a place of transaction between a vendor, holder of the apparatus, and buyers carrying a bank card.

BACKGROUND OF THE PRIOR ART

On a typical front face a bank card is provided with characters in relief relative to its bearer and his bank and, on the reverse side, a magnetic track carrying information also relative to the bearer and the bank.

The payment slips in question are called bills. In actual fact, the apparatus publishes several examples of the same document collected together in a bundle of sheets or tickets, which is also called bill, and the apparatus itself is often called a billing machine.

Two of the sheets of the bill, one for the purchaser, the other for the vendor, are self-carboned, the third, which is more rigid, being intended for a processing center. The publishing taking place by printing sheets between, on the one hand, a bank card and a plate supporting the card having other characters in relief, defined further on, and, on the other hand, two printing rollers mounted on a carriage driven manually with a reciprocating movement. More exactly, the rollers are mounted on a pivoting stirrup and it is during the carriage return that the sheets are printed.

A bank card on its reverse side bears:

the name of its bearer, a number, comprising fifteen figures or so, representing the bank identity of the bearer, expiry date of the validity of the card.

The plate of the card support publishing apparatus has, on the side receiving the card, at least three groups of characters:

the name and address of the vendor, a bank identity number of the vendor, the date of the transaction, the amount of the transaction, on some publishing apparatus.

The first two groups of characters of the plate represent constant data, such as those of a bank card, whereas the last groups of characters of the plate represent variable data concerning the transaction.

The variable data characters are carried respectively by printing wheels, each having a series of ten figures from 0 to 9, the wheels projecting slightly from the plate and being mounted for rotation on the apparatus so as to be able, at the beginning of the day and at each transaction, to select their angular positions and thus the values of variable data such as the date and amount of the transaction.

To be complete, it will be noted that the bill blanks each comprise pre-printed boxes for receiving respectively an operation number, an authorization number, a certificate number and the signature of the buyer.

These publishing apparatus have the advantage of being relatively simple and robust.

However, they have some drawbacks.

The wheels for publishing the date and the amount of the transaction are sometimes difficult to index to the extent that the vendors very often write the amount of the transaction by hand, perhaps also to avoid any ambiguity due to the absence of a stop before the figures of the cents.

Contrary to checks, with which they have something in common, the bills only comprise characters which can be read optically; i.e., typically they do not have CMC7 magnetically readable characters.

The result is that the bank processing of the bills is not easy; it involves acquiring all the characters again. Since the transactions are made without any connection with the processing or authorization center, they carry no guarantee as to their validity, quite apart from the risks of fraud.

SUMMARY OF THE INVENTION

The present invention aims at overcoming these drawbacks.

For this, the present invention relates to a bill publishing apparatus for payment by bank card at a place of transaction, comprising a frame; on the frame, an apertured plate with characters in relief representing constant data, means for receiving a bank card and means for receiving a bill, at least one printing drum with rotary wheels projected from apertures formed in the plate, each of said rotary wheels carrying a series of characters in relief representing variable data, the rotary wheels being manually driven in rotation by a user rotation for selecting their angular positions and thus variable data values and a carriage carrying at least one printing roller, said carriage being mounted for movement along the plate for printing the bill by cooperation between the plate, the printing face of the bank card, and the roller, wherein is characterized by the fact that each selection wheel is locked for rotation with a corresponding coding disk carrying a series of codes associated respectively with the characters of the wheel, means are provided for reading the codes of the coding disks and means, controlled by the reading means are provided for thus recording the angular positions of the wheels and hence the values of the corresponding user-entered variable data.

With the invention, the information recorded by the recording means of the publishing apparatus may be readily transmitted to a bank processing center which may also acquire all the transactions of the holder of the apparatus, such acquirement taking place through an apparatus such as that commercially available under the trademark Minitel, a modem and the switched telephone network or a specialized network.

It will be noted that the apparatus of the invention, while solving the problem sought to be addressed, i.e., safety of transactions and automation of the processing operations, remains just as robust as those of the prior art. With respect to an electronic payment terminal, this apparatus is very simple, very reliable and inexpensive.

In a preferred embodiment of the apparatus of the invention, each selection wheel and its coding disk are made in a single piece, the codes and the printing characters are disposed respectively on two adjacent cylindrical bands, the coding band having a diameter less than that of the printing band, for staggering the codes with respect to the printing characters and thus preventing the codes from being in the printing plane.

Advantageously, each code is formed of an association of signs extending respectively over corresponding zones of the coding disk.

In this case, the apparatus of the invention may comprise a series of elementary reading means associated respectively with different coding zones of the same code, each elementary reading means being adapted for sequentially reading the associated zones of the respective codes of the selection wheels. In other words, there are as many elementary reading means as there are coding signs in the codes and each elementary reading means reads in turn the sign or zone, which is associated therewith, of the codes corresponding to the selected characters of all the selection wheels.

Such sequential reading may take place by sequential illumination of the coding zones associated with each elementary reading means.

In another very advantageous embodiment of the publishing apparatus of the invention, the carriage carries a head disposed under the plate for reading, through a window formed in the plate, a magnetic track extending over the face of the bank card opposite its printing face.

With this additional characteristic, the information of the magnetic track of a bank card, during printing of the bill, may be read twice, on the outward and on the return travel of the carriage, before being recorded in the apparatus and then transmitted to the processing center.

BRIEF DESCRIPTION OF THE DRAWINGS

The invention will be better understood from the following description of a preferred embodiment of the printing apparatus, with reference to the accompanying drawings in which.

DESCRIPTION OF THE PREFERRED EMBODIMENT

Figure 1:
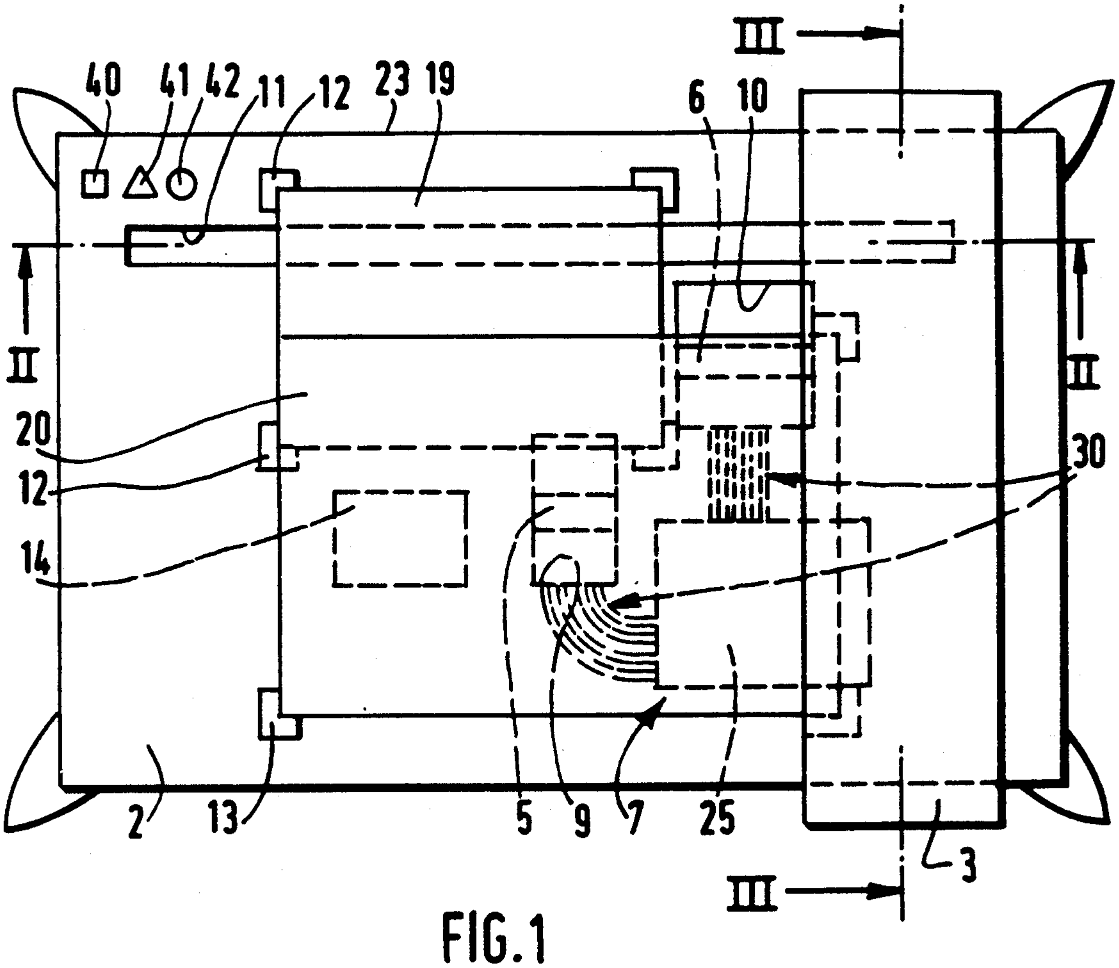
FIG. 1 is a top view of the publishing apparatus.
Figure 2:
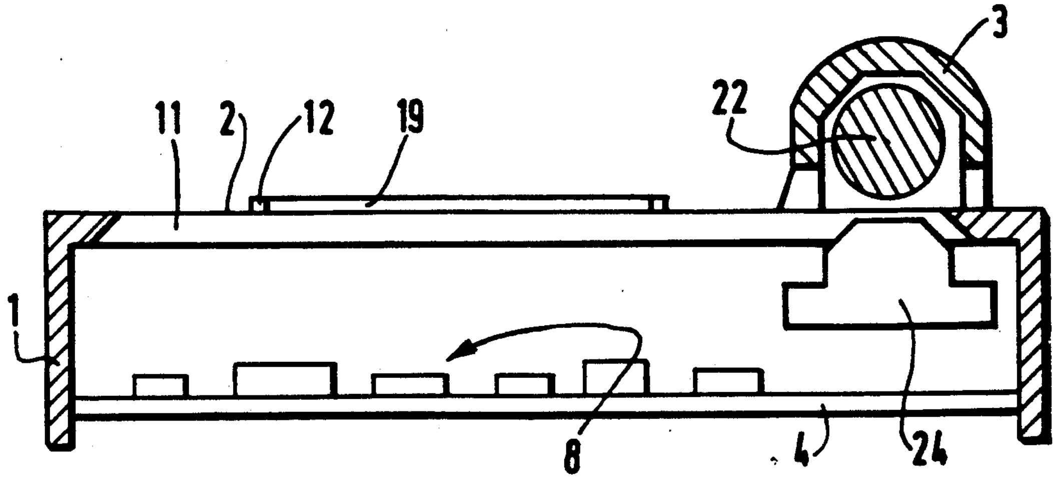
FIG. 2 shows a schematic sectional view of the apparatus through line II—II of FIG. 1.

The apparatus shown in the figures is intended to be used for publishing bills. It handles and processes payment slips printed which are signed by the buyers who are bearers of a bank card, at the very place where the transactions between buyers and a vendor, generally a shopkeeper holding the apparatus, take place. It can handle bank cards or so-called credit cards of all types, including chip or memory cards. These cards typically comprise on both faces characters relative to their holder and their bank, on one side, which are readable and in relief and, on the other side, written on a magnetic track.

The apparatus comprises a frame 1 with an upper plate 2 and a mobile printing and magnetic reading carriage 3. Between plate 2 and a bottom 4 are disposed a drum 5 with rotary wheels for printing the transaction dates, drum 6 with rotary wheels for printing the amounts of the transactions, an opto-electronic processing module 7 and other electronic components 8.

Plate 2, generally rectangular in shape, comprises two openings 9, 10 for rollers 5 and 6, respectively, through which figures in relief carried by the printing wheel project.

The figures of the printing wheel 26 of drums 5, 6 represent variable data, the wheels being driven in rotation for selecting their angular positions and thus variable data values relating to dates and amounts of transactions.

Plate 2 comprises a third elongate opening, or aperture 11, extending close to and parallel with one of the longitudinal edges 23 of the plate, in the direction of movement of carriage 3 and the utility of which will be clear further on.

Plate 2 further comprises four small shoes 12 for receiving the four corners of a bank card 19, on each side of aperture 11, so that, with the card laid on plate 2 and its face carrying the magnetic track turned towards the plate, the magnetic track extends above and along aperture 11.

Plate 2 further comprises here three other shoes 13 for receiving three corners of a bill 20 disposed, with respect to the bank card reception shoes, so that the readable and relief characters of the card are located under the upper left-hand corner of the bill, the wheels of drum 5 being substantially in the center of the bill and the wheels of drum 6 under the upper right-hand corner of the bill. Finally, plate 2 comprises a wafer 14 carrying readable figures and letters in relief forming constant data relative to the holder of the apparatus and his bank. Wafer 14 is disposed so as to be situated under the upper left-hand corner of the bill.

Carriage 3 is mounted for translational movement on frame 1 and above plate 2, by two lateral bent arms 15 extending through two lateral grooves 16 formed inside the walls of frame 1. Carriage 3 is guided in its movement, caused manually by the holder of the apparatus, by two lateral pairs of rollers 17, 18 rolling on a flange 21 of plate 2.

Carriage 3 carries here a printing roller 22 mounted freely on its shaft but on a pivoting stirrup, not shown for the sake of clarity.

Figure 3:
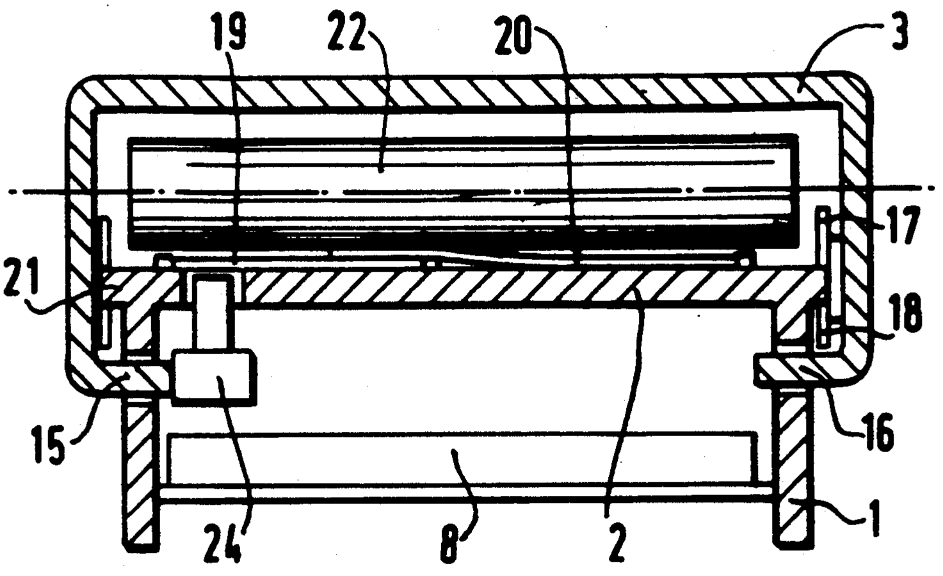
FIG. 3 is a schematic sectional view of the apparatus through line III—III of FIG. 1.
Figure 4:
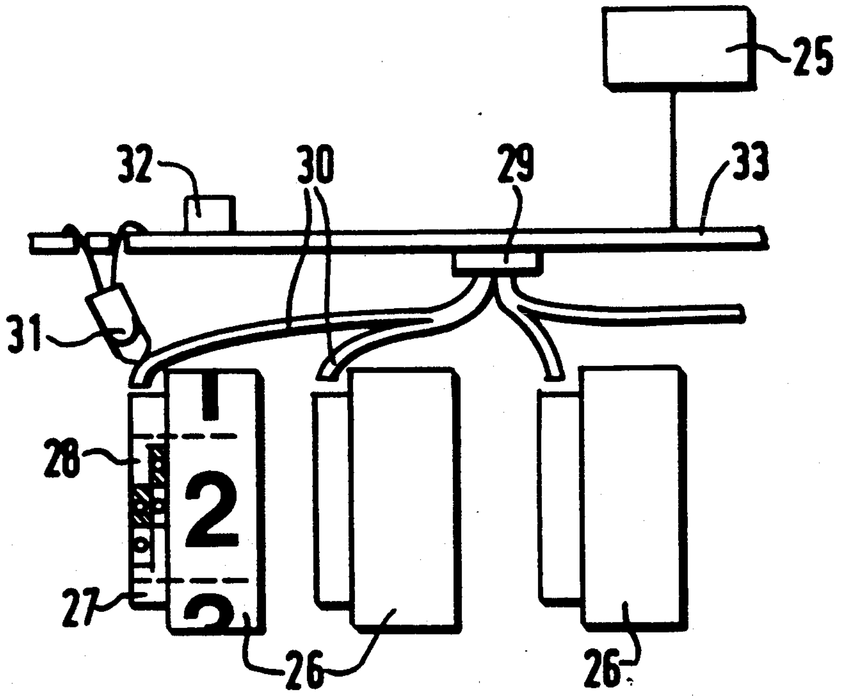
FIG. 4 is a schematic view of the opto-electronic module of the apparatus of FIGS. 1 to 3.

With the bank card 19 placed on plate 2 then, on top, bill 20, as illustrated schematically in FIG. 3, the operator begins to move carriage 3 from right to left in FIG. 1, the roller holding stirrup remaining in this outward movement in a top position. It is only during the return movement, from left to right in FIG. 1, that roller 22 by rubbing on the card and the bill causes the stirrup to pivot towards plate 2, so that the card and the bill are nipped between roller 22 and plate 2 and so that the bill is printed, in so far as the data of the card is concerned, between the face of the card carrying the characters in relief and the printing roller 22. As for printing on the bill data relative to the date and the amount of the transaction, it takes place between roller 22 and the wheels of drums 5, 6.

The mechanical structure of the publishing apparatus being described, its magneto-electronic and opto-electronic characteristics may now be described.

The bent arm 15 of carriage 3, guided in groove 16 formed in the lateral wall of the frame defined by the edge 23 of plate 2 carries, at its end disposed under plate 2, a head 24 for magnetically reading the magnetic track of the bank card placed on plate 2, reading taking place by means of aperture 11.

The data written on the track is read twice during the outward and return movement of carriage 3 and transmitted to a processing and recording unit 25 to which the reading head 24 is connected.

The reading of the data of the magnetic track of bank cards takes place through aperture 11. If the reading head 24 is not to be physically in contact with the track, aperture 11 may be obstructed by a magnetically transparent material.

Each selection wheel 26 comprises a lateral portion 27 of reduced diameter forming a disk, at the periphery of which are provided, in the radial sectors containing the printing characters, optical codes 28 associated respectively with these characters. In the example considered, each code 28 is formed of an association of signs, here four, extending respectively over the same number of corresponding zones. Still in the example considered, the signs are colored, here black and white, and the associated zones are slightly offset in twos along the circular coding band. Under these conditions, each code of four zones positioned with respect to each other, of black and white color, make it possible to identify one among $2^4=16$ printing characters. Elementary photosensitive reading means 29, here photodiodes or phototransistors, read codes 28 via light ducts 30, here optical fibers. There as as many photosensitive cells 29 as there are zones in each code, so in this case four disposed side by side. Thus, from each light receiver 29 an optical fiber extends which splits up into as many branches 30 as there are coding disks or selection wheels and which extend to the proximity of the coding bands 27. In the example considered, four optical fiber branches associated with four zones of the codes and preferably grouped together in the same transmission cable extend to the vicinity of the coding bands.

For a reading cell 29 considered, associated with one of the four zones of the codes, reading of the corresponding zones of the different coding disks is effected by means of illumination cells or light transmitters 31, associated respectively with the coding disks and switched on for illuminating the coding zones concerned sequentially by means of a sequencer 32.

Cells 29, 31 and sequencer 32 are mounted on a printed circuit board 33 further carrying the processing and recording unit 25, to which are electrically connected, by a bilateral series channel, the sequencer and the reception cells 29 which thus control this unit 25, with the reading head 24, for thus determining and recording, after amplification and detection, the angular positions of the selection wheels 26 and consequently the date and amount of the transaction corresponding to the whole of these angular positions. The latter may then, with the data from the reading head 24, be transmitted from the recording unit to a processing unit to which the user is connected, this latter transmission taking place in real time, for example by means of a modem and a telephone network, or in delayed time by transporting to the control center the recording medium of unit 25 at regular intervals.

It will be noted that the surface of the coding zones is more extensive than the cross-section of the end of the optical fiber branches 30 disposed in line with the coding band 27, so as to accommodate some tolerance in the positioning of the selection wheels 26.

The printed circuit board 33 is fixed to the bottom 4 to prevent any parasitic lighting from reaching the coding zones 28 or the reception cells 29.

Selection wheels and coding disks have been described which are formed coupled in a single piece. Naturally, the invention is not limited to such a construction. It is sufficient for the coding disks and the selection wheels to be interlocked in twos for rotation, i.e. the coding disks rotate at the same time as the associated selection wheels, by means of a mutual mechanical drive, including fluid or even electric drive.

The electronics 8 as a whole is simple and comparable, from the space and electric consumption points of view, to that for example of a pocket calculator. It provides certain further functions which are to be found on electronic payment terminals such as the energy supply from batteries, rechargeable accumulators or the mains.

The mechanical and electronic characteristics of the publishing apparatus having been described, its operation will now be explained.

With the apparatus connected to the telephone network, an indicator light 40, connected to unit 25, lights up if the connection is made and the apparatus thus ready for a transaction. Before the first transaction of the day, the shopkeeper selects the angular positions of the wheels of drum 5, places his own bank card on plate 2 and operates carriage 3 so as to load the data of the day into the processing unit 25.

At each transaction, he selects the angular positions of the wheels of drum 6, places the bank card 19 of his customer on plate 2, then a blank bill 20 and drives carriage 3 with a reciprocating movement. At the end of the movement, the processing unit 25 transmits to the processing center the data acquired by the reading head 24 and cells 29. The indicator light 40 goes out and another indicator light 41, connected to unit 25, lights up to show that the line is occupied. Then the indicator light 41 goes out and indicator light 40 lights up again so as to indicate that the transaction has been correctly effected. If the transaction is refused by the processing center, the indicator light 41 goes out but a third indicator light 42, also connected to unit 25, lights up.

It will be noted that the three indicator lights 40, 41, 42 may be replaced by a single indicator light with three different colors representative of the three above described states.

An apparatus has been described whose printing and reading carriage comprises only a single roller. It is clear that there could be two of them respectively for the two drums printing dates and amounts of transactions.

An apparatus has been described connected to the telephone network so to a processing center. It is an on-line apparatus. Of course, the invention also applies to an off-line apparatus, the medium carrying the recorded information being regularly sent to the processing center or such information being transmitted to this center in delayed time.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. Apparatus for publishing bills for payment by bank card at a place of transaction, comprising:

a frame;

on the frame, an apertured plate with characters in relief representing constant data, means for receiving a bank card and means for receiving a bill, at least one printing drum with rotary selection wheels projecting from apertures formed in the plate, each of said rotary selection wheels carrying a series of characters in relief representing variable data, the rotary selection wheels being manually driven in rotation by a user for selecting their angular positions and thus variable data values, and a carriage carrying at least one printing roller, said carriage being mounted for movement along the plate for printing the bill by cooperation between the plate, a printing face of the bank card and the roller, wherein each rotary selection wheel is locked for rotation with a corresponding coding disk carrying a series of codes associated respectively with the characters of the wheel, means are provided for reading the codes of the coding disks, and means, controlled by the reading means are provided for recording the angular positions of the wheels and hence the values of the corresponding user-entered variable data.

2. The apparatus as claimed in claim 1, wherein:

each rotary selection wheel and its corresponding coding disk are formed as a single piece, with the codes and the printing characters disposed respectively on two adjacent cylindrical bands, including a coding band having a diameter less than that of a printing band, with staggering of the corresponding codes with respect to characters on the printing band to prevent the codes from being located in the printing plane in use of the apparatus.

3. The apparatus as claimed in claim 1, wherein:

each code comprises an association of signs extending respectively over corresponding zones provided on the coding disk.

4. The apparatus as claimed in claim 3, wherein:

a series of elementary reading means are provided to be associated respectively with the different coding zones of the same code, each of said elementary reading means being disposed to sequentially read the associated coding zones of the respective rotary selection wheels.

5. The apparatus as claimed in claim 4, further comprising:

means for performing sequential reading of the zones of the codes by sequential illumination of the coding zones associated with each elementary reading means.

6. The apparatus as claimed in claim 4, wherein:

each of said elementary reading means comprises a photosensitive cell from which light ducts extend to the respective coding disks.

7. The apparatus as claimed in claim 3, wherein:

the reading is connected to the recording means.

8. The apparatus as claimed in claim 1, further comprising:

on the carriage, a reading head disposed under the plate for reading through a window formed in the plate a magnetic track extending over the face of the bank card on a face opposite a printing face thereof.

* * * * *